(12) United States Patent
Liu

(10) Patent No.: US 11,979,372 B2
(45) Date of Patent: May 7, 2024

(54) SYSTEM AND METHOD FOR LOOKING UP AN IP ADDRESS IN AN IP ADDRESS SPACE

(71) Applicant: Barracuda Networks, Inc., Campbell, CA (US)

(72) Inventor: Junxiao Liu, Pleasanton, CA (US)

(73) Assignee: Barracuda Networks, Inc., Campbell, CA (US)

( * ) Notice: Subject to any disclaimer, the term of this patent is extended or adjusted under 35 U.S.C. 154(b) by 270 days.

(21) Appl. No.: 17/699,941

(22) Filed: Mar. 21, 2022

(65) Prior Publication Data

US 2023/0254280 A1     Aug. 10, 2023

Related U.S. Application Data

(60) Provisional application No. 63/307,825, filed on Feb. 8, 2022.

(51) Int. Cl.
*H04L 9/40* (2022.01)

(52) U.S. Cl.
CPC ...... *H04L 63/0236* (2013.01); *H04L 63/1416* (2013.01)

(58) Field of Classification Search
CPC .......... H04L 63/0236; H04L 63/1416
USPC ............................................... 726/13
See application file for complete search history.

(56) References Cited

U.S. PATENT DOCUMENTS

| | | | | |
|---|---|---|---|---|
| 7,249,175 B1* | 7/2007 | Donaldson | ........... | G06Q 10/107 709/225 |
| 2003/0081554 A1* | 5/2003 | Huang | .............. | H04L 45/54 370/363 |
| 2007/0016637 A1* | 1/2007 | Brawn | ............... | H04L 47/2441 709/200 |
| 2010/0054154 A1* | 3/2010 | Lambert | ............ | H04L 61/5084 370/254 |
| 2012/0054869 A1* | 3/2012 | Yen | .................... | H04L 63/1441 709/245 |

* cited by examiner

Primary Examiner — Michael S McNally

(57) ABSTRACT

A new approach is proposed that supports IP address lookup. An IP address updater creates a bitmap of an IP address space, wherein each bit in the bitmap corresponds to an IP address in the IP address space. The compressed bitmap is then populated and stored permanently on a shared memory storage that is accessible by multiple client applications at the same time. The client applications may each establish and maintain a connection to the shared memory storage through an IP address lookup agent. When a lookup request for an IP address is received, the IP address lookup agent checks the bitmap and associated information of the IP address space on the shared memory storage to determine if the IP address is malicious or not and to inform the client application making the request accordingly, while the bitmap on the shared memory storage is updated with new IP address update.

24 Claims, 7 Drawing Sheets

US 11,979,372 B2

SYSTEM AND METHOD FOR LOOKING UP AN IP ADDRESS IN AN IP ADDRESS SPACE

CROSS-REFERENCE TO RELATED APPLICATIONS

This application claims the benefit of U.S. Provisional Patent Application No. 63/307,825, filed Feb. 8, 2022, which is incorporated herein in its entirety by reference.

BACKGROUND

For many web-based applications such as website reputation monitoring and filtering, it is often necessary to look up an Internet protocol (IP) address of a web-based source, e.g., a host of a website or a web-based application, in a database/space of IP addresses, to ensure that the source is not malicious. Checking the existence of the IP address in a conventional IP address database having millions of records of IP addresses is usually not a performance concern even when the IP address database is hosted on a low-end hardware. However, when the IP address database is being updated frequently, e.g., every 15 minutes, with thousands of IP addresses being inserted into and/or deleted from the IP address database followed by the need to re-index the entire IP address database, the performance of looking up an IP address in the IP address database being frequently updated will suffer a large drop-off. Since an update to the IP address database often takes a certain amount of time (e.g., 15 minutes) to complete, a further update to the IP address database may already become available even before the current update to the IP address database is finished, rendering the IP address database practically unusable for looking up the IP address due to hold-ups of system resource for the updates.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
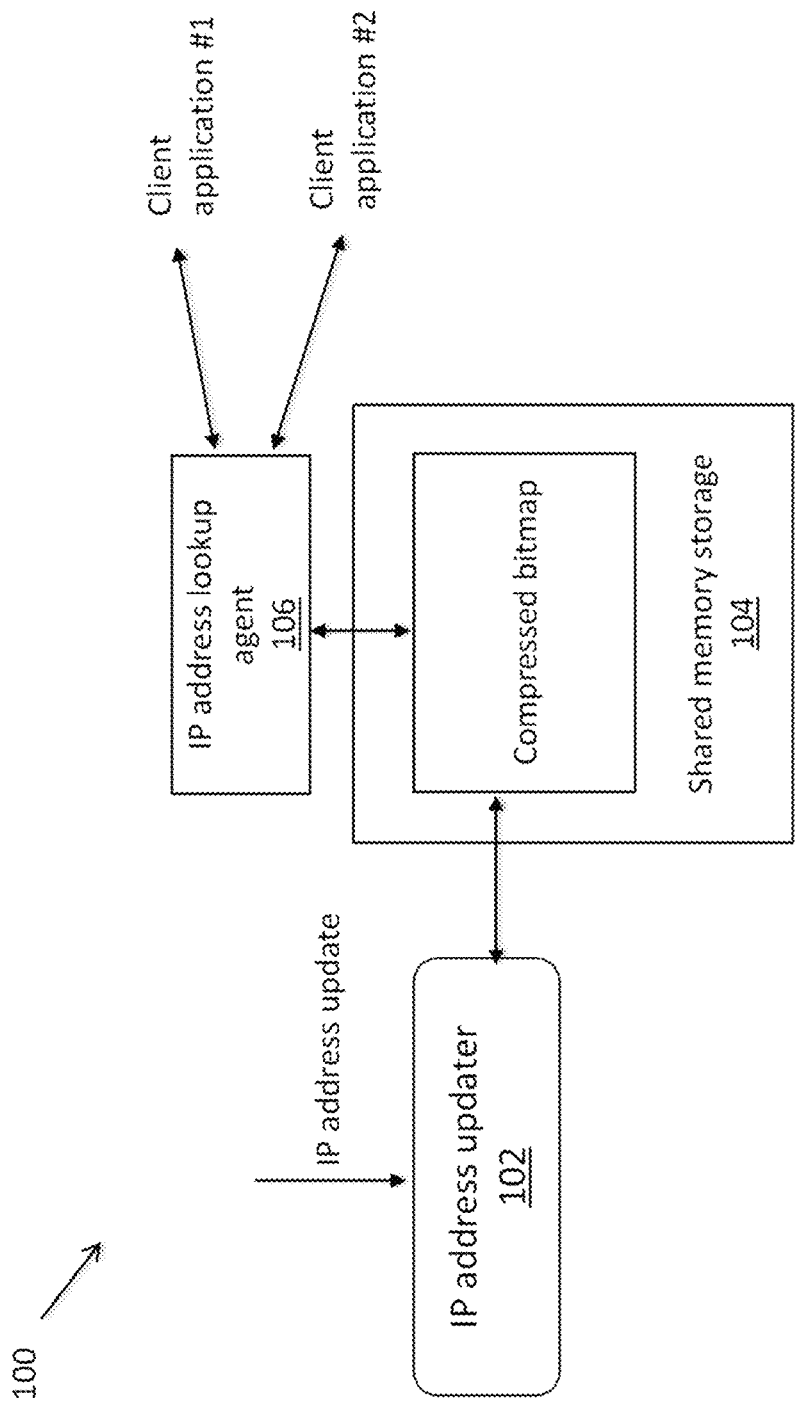
FIG. 1 depicts an example of a system diagram to support IP address lookup in accordance with an aspect of the present embodiments.

The following disclosure provides many different embodiments, or examples, for implementing different features of the subject matter. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support IP address lookup. Under the proposed approach, an IP address updater is configured to create and compress a bitmap of an entire space of IP addresses, wherein each bit in the bitmap corresponds to an IP address in the IP address space. For a non-limiting example, the IP address space can be but is not limited to an address space of IPv4 addresses. The compressed bitmap is then populated and stored permanently on a shared memory storage that is accessible by multiple client applications at the same time. The client applications may each establish and maintain a connection to the shared memory storage through an IP address lookup agent. When a lookup request for an IP address is received, the IP address lookup agent is configured to check the bitmap and associated information of the IP address space on the shared memory storage to determine if the IP address is malicious or not and to inform the client application making the request accordingly. In the meantime, the IP address updater is configured to continuously update the compressed bitmap on the shared memory storage when a new IP address update to the IP address space is received.

Since each bit in the bitmap corresponds to an IP address in the IP address space, an IP address lookup, insertion, and deletion operation takes O(1) constant time to complete based on the bitmap itself regardless of the size of the IP address space under the proposed approach. Since the bitmap is compressed, the proposed approach achieves up to 50% compression when compared to an uncompressed bitmap of the IP address space due to common IP address allocation practices. For a non-limiting example, the memory consumption for a compressed bitmap of the entire IPv4 address space is about 200 MB and the compressed bitmap enables up to hundreds of thousands of lookups per second even when running on low-end single/dual-core processors. Furthermore, the shared memory storage of the IP address space allows access from multiple clients/applications at the same time with minimal overhead.

FIG. 1 depicts an example of a system diagram 100 to IP address lookup. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes an IP address updater 102, a shared memory/database storage 104, and an IP address lookup agent 106. Each of the components in the system 100 runs on a computing unit, which includes software instructions stored in a storage such as a non-volatile memory (also referred to as secondary memory) of the computing unit. When the software instructions are executed, at least a subset of the software instructions is loaded into a memory (also referred to as primary memory) by the computing unit, the computing unit becomes a special purposed one for practicing one or more processes.

In the example of FIG. 1, each computing unit running the components in the system 100 can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each computing unit has a communication interface (not shown) for communicating with each other over a communication network (not shown), which can be but is not limited to Internet, intranet, wide area network (WAN), local area network (LAN), wireless network, Bluetooth, WiFi, and mobile communication network for internal communications among entities, components, and users of an organization. The physical connections of the communication network and the communication protocols are well known to those skilled in the art.

Figure 2A:
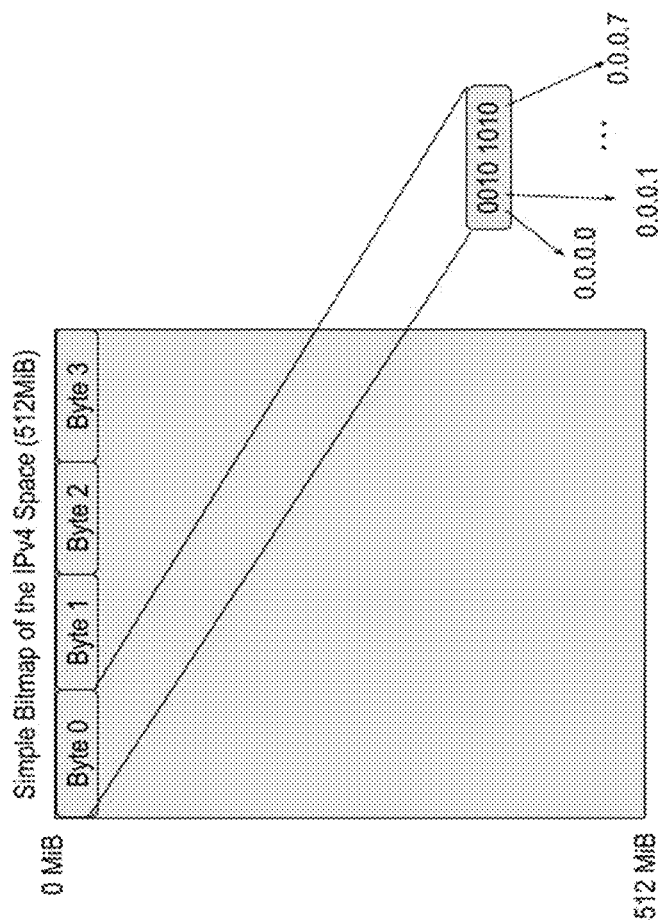
FIG. 2A depicts an example of a bitmap representing the entire IPv4 address space in accordance with an aspect of the present embodiments.
Figure 2B:
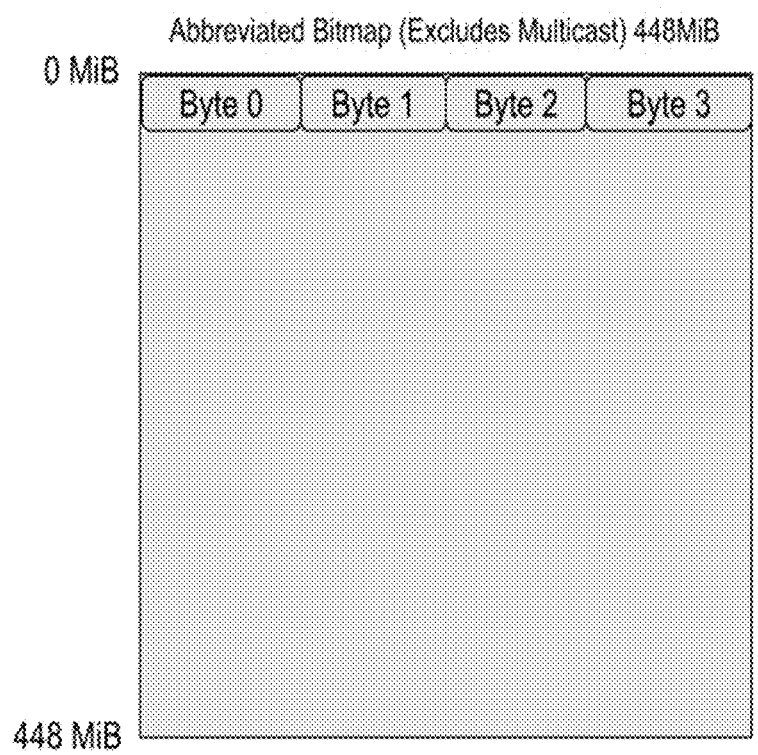
FIG. 2B depicts an example of a compressed bitmap representing the entire IPv4 address space with multicast IP addresses excluded in accordance with an aspect of the present embodiments.

In the example of FIG. 1, the IP address updater 102 is configured to create a bitmap representing an IP address space comprising a list of IP addresses in plain text, wherein each bit in the bitmap corresponds to one IP address in the list of IP addresses of the IP address space. In some embodiments, the IP address updater 102 is configured to represent each malicious IP address in the IP address space with a bit value "1" and each non-malicious IP address in the IP address space with a bit value "0," respectively. FIG. 2A depicts an example of a bitmap representing the entire IPv4 address space, which takes 512 MiBs (4,294,967,296 bits) of memory space. As shown by the example of FIG. 2A, each Mebibyte (MiB) of the bitmap comprises 4 bytes (e.g., Byte 0, . . . , Byte 3) each having 8 bits. For a non-limiting example, Byte 0 is (00101010) corresponding to 8 IP addresses 0.0.0.0 to 0.0.0.7, respectively, wherein 0.0.0.1, 0.0.0.4, and 0.0.0.6 are represented by the bit value "1", indicating that these IP addresses are malicious while other IP addresses represented by the bit value "0" in Byte 0 are non-malicious. In some embodiments, the IP address updater 102 is configured to compress the bitmap by excluding certain IP addresses that are not reachable or routable over the Internet to create an abbreviated/compressed bitmap that occupies less memory space. FIG. 2B depicts an example of a compressed bitmap representing the entire IPv4 address space with multicast IP addresses (which are unreachable) excluded. Compared to the example of the bitmap depicted in FIG. 2A, which takes 512 MiB, the example of the abbreviated bitmap in FIG. 2B takes less memory space at 448 MiB.

Figure 3:
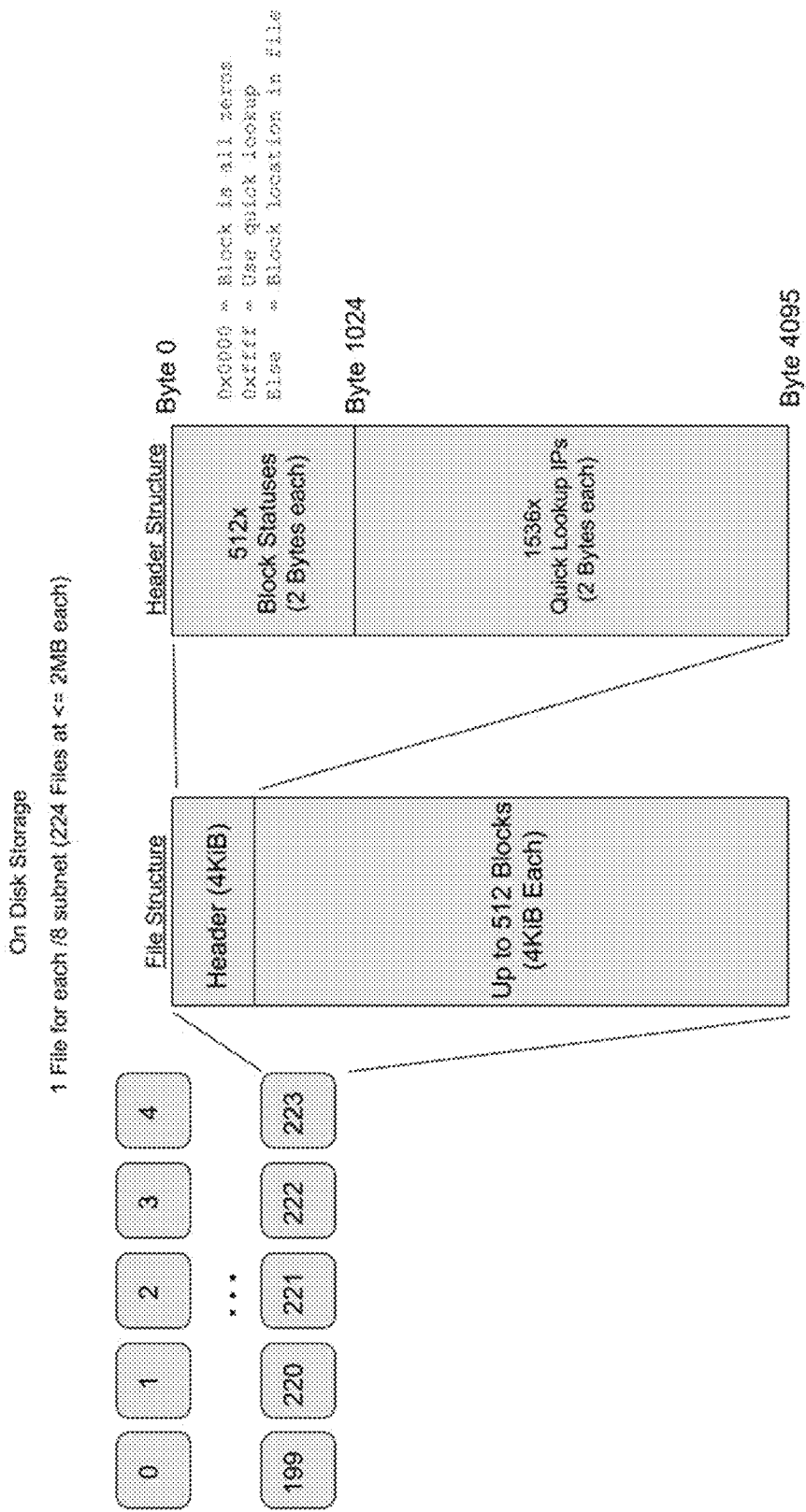
FIG. 3 depicts an example of a storage paradigm of a bitmap of an IP address space in accordance with an aspect of the present embodiments.

In some embodiments, the IP address updater 102 is configured to divide the IP address space into a plurality of one or more files and their subnets, blocks, and/or individual IP addresses based on how the IP address space is allocated and/or contents of a list of typical malicious IP addresses in order to save memory and/or disk space where the bitmap is stored. For a non-limiting example, a typical IP address space contains multiple small ranges of malicious IP addresses separated by large ranges of non-malicious/unused IP addresses. If an entire subnet or block is clean, e.g., free of malicious IP addresses, the IP address updater 102 is configured to represent such status of the entire block with a 2-byte (4 KiB) header per block, without the need for further lookup. In some embodiments, since malicious traffic often arrives from the same source IP addresses, a quick lookup cache of one or more malicious IP addresses in a block can be included to improve space efficiency in a relatively empty block with few malicious IP addresses. FIG. 3 depicts an example of a storage paradigm of a bitmap of an IP address space on a disk storage, wherein the IP address space includes 224 files (0, . . . , 223), wherein each file 302 includes a header 304 and up to 512 blocks 306s. The header 304 and each of the blocks 306 is 4 KiB in size and the file 302 is less than 2 MiB in size. In some embodiments, each file 302 includes one subnet, which can be different in size depending on the mask being applied, e.g., an /8 (netmask 255.0.0.0) subnet may hold x.0.0.0–x.255.255.255 for a total of 16,777,216 IP addresses. As shown by the example of FIG. 3, the header 304 of the file 302 has two portions—a block status portion 306 and a malicious IP address lookup portion 308. The block status portion 306 (e.g., Byte 0 to Byte 1023) covers the current statuses of the 512 blocks 304s, wherein the status of each block 304 is represented by 2 bytes. Here, 2-byte value 0x0000 means the block 304 is clean (all zero) of malicious addresses, 0×ffff means quick malicious IP address lookup should be used, and any other number points to the block 304's location in the file 302. The IP address lookup portion 308 (e.g., Byte 1024 to Byte 4095) includes quick lookup of malicious IP addresses in the 512 blocks 304s, e.g., 3 per block, wherein each malicious IP address is represented by 2 bytes for a total number of 1536 malicious IP addresses.

Figure 4:
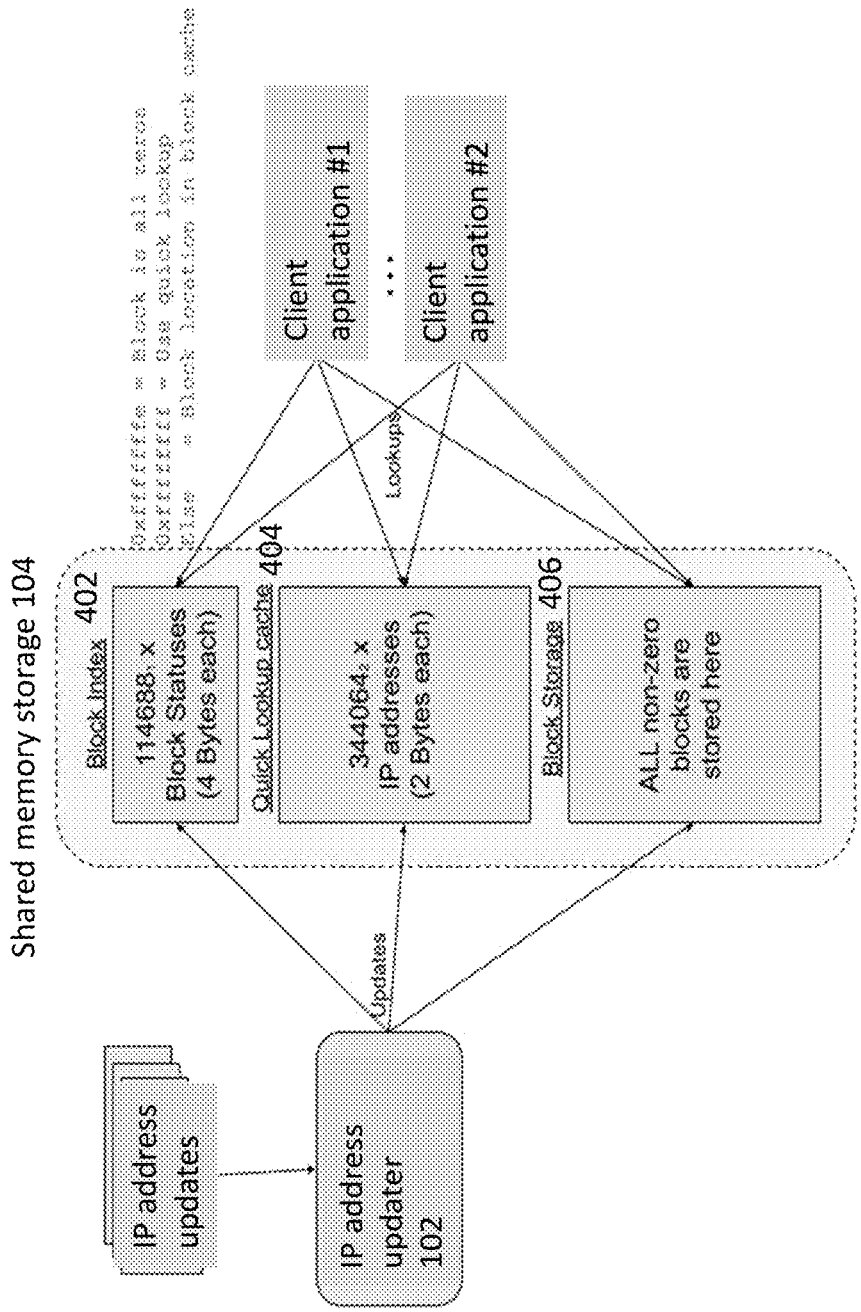
FIG. 4 depicts an example of memory allocation of the shared memory storage that stores all files, blocks and malicious IP addresses in accordance with an aspect of the present embodiments.

In some embodiments, once the shared memory storage 104 has been allocated, the IP address updater 102 is configured to read the bitmap of the IP address space from the disk storage, and populate and store the bitmap of the IP address space in the shared memory storage 104, where the bitmap is accessible by multiple client applications, e.g., client application #1, client application #2, etc. Here, the shared memory storage 104 is part of a memory or a storage device, which can be but is not limited to a Random Access Memory (RAM) including but not limited to SRAM and/or DRAM, a flash (e.g., NAND) drive, a hard disk drive (HDD), or a solid-state drive (SSDs). FIG. 4 depicts an example of memory allocation of the shared memory storage 104 that stores all 224 files and their subnets, blocks and malicious IP addresses as discussed above. In the example of FIG. 4, the shared memory storage 104 includes a block index 402 of the statuses of the blocks, a quick lookup cache 404 of malicious IP addresses of the blocks, and a block storage 406 of the bitmaps of all blocks with non-zero bit values, indicating that there are malicious IP addresses in the blocks. As shown in the example of FIG. 4, there are 224×512=114688 blocks covered by the shared memory storage 104, wherein each block has a 2-byte status in the block index 402 for a total of 114688 block statuses, up to 3 malicious IP addresses each 2-byte in size in the quick lookup cache 404 for a total of 344064 malicious IP addresses, and non-zero blocks using 4 KiB each in the block storage 406 as discussed above. Since the quick lookup cache 404 contains up to 3 malicious IP addresses via 2 bytes per block in lieu of using 4 KiB per block; the quick lookup cache 404 helps to improve memory usage efficiency, which is especially important on low-end machines which may only have 2 GiB of system memory space available to store the bitmap of the IP address space.

After the shared memory storage 104 has been populated with the bitmap of the IP address space, the IP address updater 102 is configured to continue to monitor and wait for an update to the IP address space in the form of, e.g., an IP address changeset to the IP address space, wherein the IP address changeset includes a list of IP addresses to be inserted into or deleted from the IP address space. In some embodiments, the update to the IP address space can happen periodically, e.g., every 15 minutes. Once the update to the IP address space is received, the IP address updater 102 is configured to re-create/update portions of the bitmap of the IP address space that has been affected by the IP address update and to load the updated bitmap on the shared memory storage 104 accordingly. In some embodiments, the IP address updater 102 is configured to enable one or more client applications to continue accessing portions of the bitmap stored on the shared memory storage 104 that are not affected by the IP address update while the other portions of the bitmap containing IP addresses affected by the IP address update are being re-created and re-populated to the shared memory storage 104.

Figure 5:
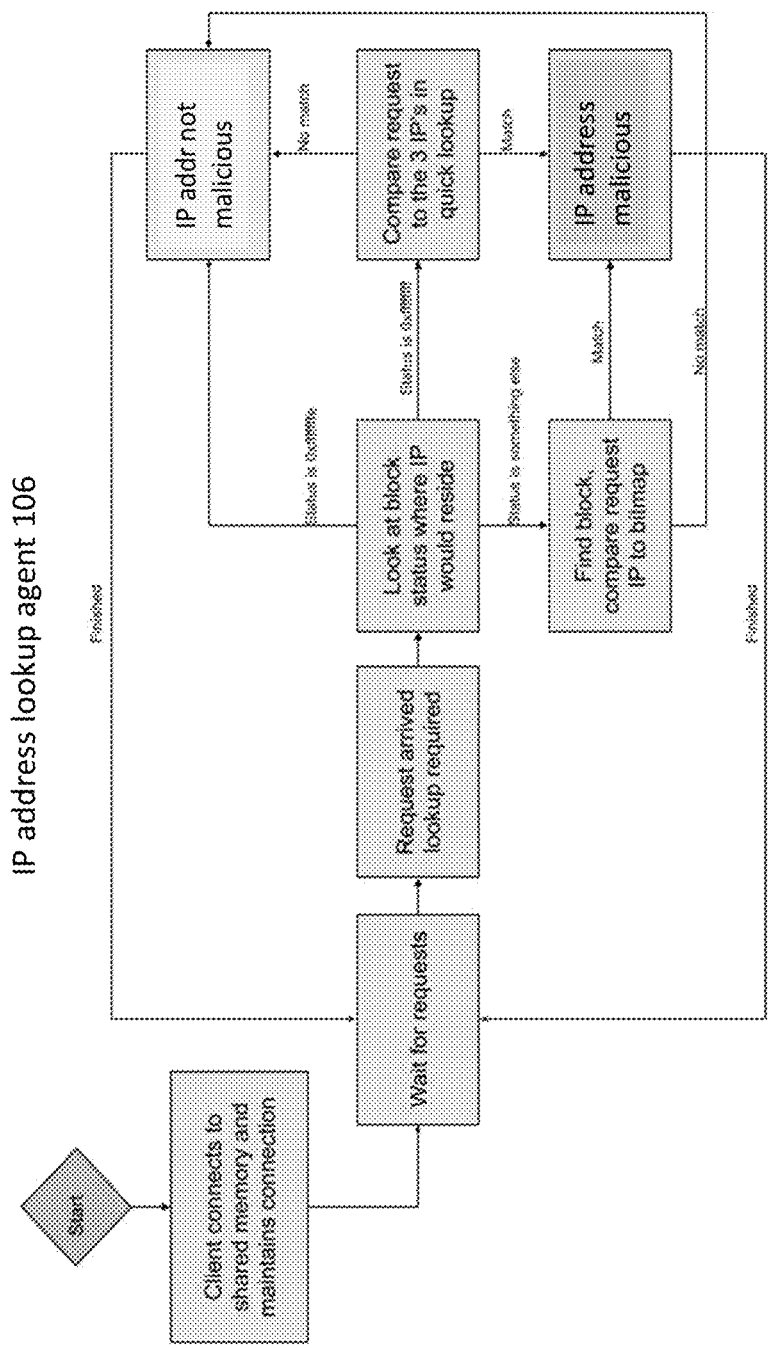
FIG. 5 depicts an example of a flowchart depicting an IP address lookup process by the IP address lookup agent via the shared memory storage in accordance with an aspect of the present embodiments.

FIG. 5 depicts an example of a flowchart depicting an IP address lookup process by the IP address lookup agent 106 via the shared memory storage 104. In the example of FIG. 5, one or more client applications are each configured to establish and maintain a communication link/connection with the IP address lookup agent 106 associated with the client applications and/or the shared memory storage 104 over one or more communication networks. Here, each of the client applications can be a web-based application or service. The IP address lookup agent 106 is configured to accept an IP address lookup request from each of the client applications, wherein the IP address lookup request includes an IP address that needs to be looked up in the IP address space to determine if the IP address is malicious or not. Once the IP address lookup request is received, the IP address lookup agent 106 is configured to determine a block of the IP address space where the IP address resides/belongs to and check the status of the block. If the status of the block is all zeros (e.g., 0x0000 for 2 bytes or 0xffffffe for 4 bytes), meaning the block is clean of malicious addresses, the IP address lookup agent 106 will respond back to the client application by sending the IP address lookup request that the requested address is not found to be malicious. If the status of the block is 0xffff, the IP address lookup agent 106 will perform a quick lookup by comparing the IP address in the request with the three malicious IP addresses in the quick lookup cache of the block. If a match is found, the IP address in the request is malicious. Otherwise, the IP address in the request is not malicious. If the status of the block is of any other value, the IP address lookup agent 106 is configured to check the bitmap of the block. If the bit corresponding to the IP address in the bitmap is '1', the IP address is determined to be malicious. Otherwise, the IP address in the request is not malicious. The IP address lookup agent 106 will then report the quick lookup result to the client application sending the IP address lookup request accordingly.

Figure 6:
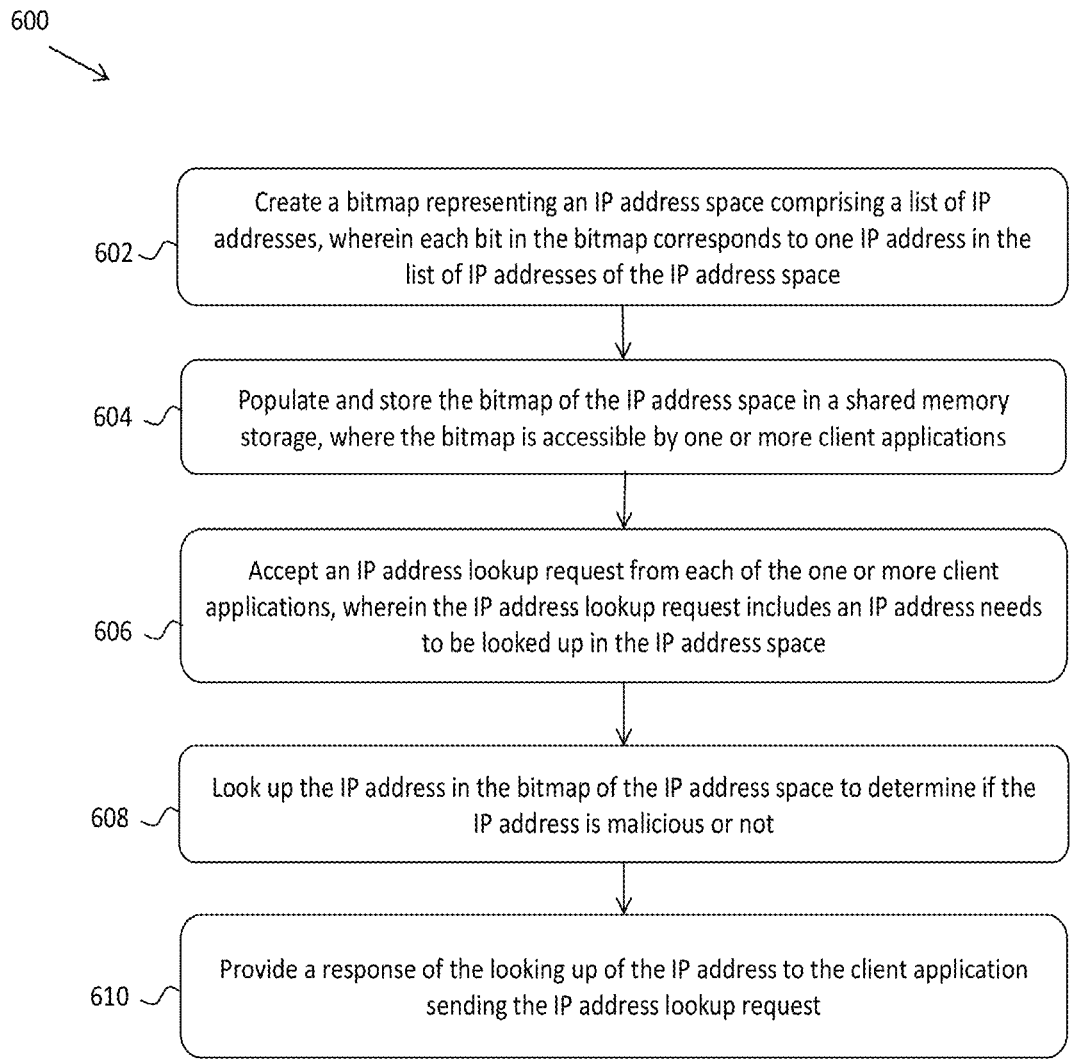
FIG. 6 depicts a flowchart of an example of a process to support IP address lookup in accordance with an aspect of the present embodiments.

FIG. 6 depicts a flowchart 600 of an example of a process to support IP address lookup. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 6, the flowchart 200 starts at block 202, where a bitmap representing an IP address space comprising a list of IP addresses is created, wherein each bit in the bitmap corresponds to one IP address in the list of IP addresses of the IP address space. The flowchart 600 continues to block 604, where the bitmap of the IP address space is populated and stored in a shared memory storage, where the bitmap is accessible by one or more client applications. The flowchart 600 continues to block 606, where an IP address lookup request from each of the one or more client applications is accepted, wherein the IP address lookup request includes an IP address that needs to be looked up in the IP address space. The flowchart 600 continues to block 608, where the IP address is looked up in the bitmap of the IP address space to determine if the IP address is malicious or not. The flowchart 600 ends at block 610, where a response of the looking up of the IP address is provided to the client application sending the IP address lookup request.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine-readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application-specific integrated circuits for performing the methods.

What is claimed is:

1. A system, comprising:
   an IP address updater configured to
      create a bitmap representing an IP address space comprising a list of IP addresses, wherein each bit in the bitmap corresponds to one IP address in the list of IP addresses of the IP address space;
      populate and store the bitmap of the IP address space in a shared memory storage, where the bitmap is accessible by one or more client applications;
   an IP address lookup agent configured to
      accept an IP address lookup request from each of the one or more client applications, wherein the IP address lookup request includes an IP address that needs to be looked up in the IP address space;
look up the IP address in the bitmap of the IP address space to determine if the IP address is malicious or not;
provide a response of the looking up of the IP address to the client application sending the IP address lookup request.

2. The system of claim 1, wherein:
the shared memory storage is part of a Random Access Memory (RAM), a flash drive, a hard disk drive (HDD), or a solid-state drive (SSDs).

3. The system of claim 1, wherein:
the IP address updater is configured to represent each malicious IP address in the IP address space with a bit value "1" and each non-malicious IP address in the IP address space with a bit value "0," respectively.

4. The system of claim 1, wherein:
the IP address updater is configured to compress the bitmap by excluding certain IP addresses that are not reachable or routable over Internet to create a compressed bitmap.

5. The system of claim 1, wherein:
the IP address updater is configured to divide the IP address space into a plurality of one or more files and their subnets, blocks, and/or individual IP addresses based on how the IP address space is allocated and/or contents of a list of typical malicious IP addresses.

6. The system of claim 5, wherein:
the IP address updater is configured to represent status of a block with a header accordingly if the block is free of malicious IP addresses.

7. The system of claim 6, wherein:
the IP address updater is configured to determine that the IP address in the IP address lookup request is not malicious according to the status of the block that the IP address belongs to.

8. The system of claim 5, wherein:
the IP address updater is configured to include one or more malicious IP addresses in a quick lookup cache of a block if the block has few malicious IP addresses.

9. The system of claim 8, wherein:
the IP address updater is configured to perform a quick lookup by comparing the IP address in the request with the malicious IP addresses in the quick lookup cache of the block.

10. The system of claim 5, wherein:
the shared memory storage includes an index of the statuses of the blocks, a quick lookup cache of malicious IP addresses of the blocks, and a block storage of the bitmaps of the blocks having malicious IP addresses.

11. The system of claim 1, wherein:
the IP address updater is configured to continue to monitor and wait for an update to the IP address space after the shared memory storage has been populated with the bitmap of the IP address space.

12. The system of claim 11, wherein:
the IP address updater is configured to update a portion of the bitmap of the IP address space that has been affected by the update to the IP address space and to load the updated bitmap on the shared memory storage accordingly once the update to the IP address space is received.

13. The system of claim 11, wherein:
the IP address updater is configured to enable the one or more client applications to continue accessing portions of the bitmap stored on the shared memory storage that are not affected by the update to the IP address space while the other portions of the bitmap containing IP addresses affected by the update to the IP address space are being re-created and re-populated.

14. A computer-implemented method, comprising:
creating a bitmap representing an IP address space comprising a list of IP addresses, wherein each bit in the bitmap corresponds to one IP address in the list of IP addresses of the IP address space;
populating and storing the bitmap of the IP address space in a shared memory storage, where the bitmap is accessible by one or more client applications;
accepting an IP address lookup request from each of the one or more client applications, wherein the IP address lookup request includes an IP address that needs to be looked up in the IP address space;
looking up the IP address in the bitmap of the IP address space to determine if the IP address is malicious or not;
providing a response of the looking up of the IP address to the client application sending the IP address lookup request.

15. The method of claim 14, further comprising:
representing each malicious IP address in the IP address space with a bit value "1" and each non-malicious IP address in the IP address space with a bit value "0," respectively.

16. The method of claim 14, further comprising:
compressing the bitmap by excluding certain IP addresses that are not reachable or routable over Internet to create a compressed bitmap.

17. The method of claim 14, further comprising:
dividing the IP address space into a plurality of one or more files and their subnets, blocks, and/or individual IP addresses based on how the IP address space is allocated and/or contents of a list of typical malicious IP addresses.

18. The method of claim 17, further comprising:
representing status of a block with a header accordingly if the block is free of malicious IP addresses.

19. The method of claim 18, further comprising:
determining that the IP address in the IP address lookup request is not malicious according to the status of the block that the IP address belongs to.

20. The method of claim 17, further comprising:
including one or more malicious IP addresses in a quick lookup cache of a block if the block has few malicious IP addresses.

21. The method of claim 20, further comprising:
performing a quick lookup by comparing the IP address in the request with the malicious IP addresses in the quick lookup cache of the block.

22. The method of claim 14, further comprising:
continuing to monitor and wait for an update to the IP address space after the shared memory storage has been populated with the bitmap of the IP address space.

23. The method of claim 22, further comprising:
updating a portion of the bitmap of the IP address space that has been affected by the update to the IP address space and loading the updated bitmap on the shared memory storage accordingly once the update to the IP address space is received.

24. The method of claim 22, further comprising:
enabling the one or more client applications to continue accessing portions of the bitmap stored on the shared memory storage that are not affected by the update to the IP address space while the other portions of the bitmap containing IP addresses affected by the update to the IP address space are being re-created and re-populated.

* * * * *